US012151393B2

(12) United States Patent
Schoeler et al.

(10) Patent No.: US 12,151,393 B2
(45) Date of Patent: Nov. 26, 2024

(54) CONSTRUCTION BOARD AND METHOD OF MAKING SAME

(71) Applicant: SIEMPELKAMP MASCHINEN-UND ANLAGENBAU GMBH, Krefeld (DE)

(72) Inventors: Michael Schoeler, Rheurdt (DE); Joerg Heinz Hueneke, Krefeld (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 331 days.

(21) Appl. No.: 17/621,286

(22) PCT Filed: Aug. 5, 2020

(86) PCT No.: PCT/EP2020/072031
§ 371 (c)(1),
(2) Date: Dec. 21, 2021

(87) PCT Pub. No.: WO2021/023782
PCT Pub. Date: Feb. 11, 2021

(65) Prior Publication Data

US 2022/0355507 A1 Nov. 10, 2022

(30) Foreign Application Priority Data

Aug. 8, 2019 (DE) ......................... 102019121471.8

(51) Int. Cl.

| | |
|---|---|
| ***B27N 3/14*** | (2006.01) |
| ***B27N 3/02*** | (2006.01) |
| ***B27N 3/04*** | (2006.01) |
| ***B27N 3/18*** | (2006.01) |
| ***B27N 3/28*** | (2006.01) |
| ***B27N 7/00*** | (2006.01) |

(52) U.S. Cl.
CPC ............... *B27N 3/143* (2013.01); *B27N 3/02* (2013.01); *B27N 3/04* (2013.01); *B27N 3/18* (2013.01); *B27N 3/28* (2013.01); *B27N 7/005* (2013.01)

(58) Field of Classification Search
CPC . B27N 3/143; B27N 3/02; B27N 3/04; B27N 3/18; B27N 3/28; B27N 7/005; B27N 7/00; B27N 3/10; B27N 3/14
See application file for complete search history.

(56) References Cited

U.S. PATENT DOCUMENTS 4,364,984 A 12/1982 Wentworth
6,461,743 B1 10/2002 Tanzer
(Continued)

FOREIGN PATENT DOCUMENTS

DE 1202481 A 10/1965
DE 4434876 A 4/1996
DE 19913589 A 9/2000
(Continued)

*Primary Examiner* — Daniel H Lee
(74) *Attorney, Agent, or Firm* — Andrew Wilfod

(57) ABSTRACT

The invention relates to a material board, in particular an engineered wood board (1) comprising at least one core layer (2) made of strands (3), and outer layers (4, 5) made of chips (6), characterised in that one or both of the outer layers (4, 5) is/are designed as partial-coverage outer layers such that individual strands (3) extend at least partly through the outer layer (4, 5) up to the board surface, thereby forming interruptions in the outer layer (4, 5).

12 Claims, 3 Drawing Sheets

(56) References Cited

U.S. PATENT DOCUMENTS

| | | | | | |
|---|---|---|---|---|---|
| 2014/0370319 | A1* | 12/2014 | Vetter | .................... | B27N 7/005 264/173.1 |
| 2020/0122438 | A1 | 4/2020 | Stadler | | |

FOREIGN PATENT DOCUMENTS

| | | | | | | |
|---|---|---|---|---|---|---|
| DE | 20015725 | A | | 9/2001 | | |
| DE | 102005038833 | A | | 2/2007 | | |
| DE | 102015120653 | A | | 6/2017 | | |
| DE | 102016110070 | A | | 11/2017 | | |
| DE | 102016110075 | A | | 11/2017 | | |
| DE | 102016110075 | A1 | * | 11/2017 | ............... | B27N 3/14 |
| DE | 102017111134 | A | | 11/2018 | | |
| DE | 202017104749 | A | | 12/2018 | | |
| EP | 3181314 | A | | 6/2017 | | |
| EP | 3181314 | A1 | * | 6/2017 | ............... | B27N 3/06 |

* cited by examiner

CONSTRUCTION BOARD AND METHOD OF MAKING SAME

CROSS REFERENCE TO RELATED APPLICATIONS

This application is the US-national stage of PCT application PCT/EP2020/072031 filed 5 Aug. 2020 and claiming the priority of German patent application 10 2019 121 471.8 itself filed 8 Aug. 2019.

FIELD OF THE INVENTION

The invention relates to a construction board, in particular a wood construction board comprising at least one (inner) core (or middle) layer made of strands and (outer) cover layers or outer layers made of chips. The (wood) construction board is made from a pressed material mat that, on the one hand, contains the strands for the core layer and, on the other hand, the chips for the cover layers, using pressure and heat by pressing (in a hot press).

In the prior art, wood construction boards are generally either fiber boards (e.g. MDF boards) made from wood fibers, chipboards made from wood chips, or OSB (oriented-strand) boards made from generally parallel or oriented strands. The particles are always pressed with suitable binders, and as a rule the particles are in the form of glued or glued particles provided with a binder and supplied and strewed to form a mat that is subsequently hot-pressed.

Furthermore, multilayer wood construction boards are known from the prior art that consist of different wood material particles as hybrid boards, for example both from strands and from chips.

In the context of the invention, the strands used are basically those for OSB boards that are also referred to as coarse chips or thin elongated chips that have a (mean) length of more than 50 mm, preferably more than 80 mm, for example 100 mm to 200 mm. The (mean) width is more than 5 mm, preferably more than 8 mm, e.g. 10 mm to 50 mm. The (average) thickness is more than 0.5 mm, e.g. 0.6 mm to 1.5 mm. In the context of the invention, the core layer is made from such strands.

In contrast, the cover layers, that is to say the upper cover layer and the lower cover layer, are made from (classical) chips that have significantly smaller dimensions than the strands. They have a (mean) length of less than 20 mm, preferably less than 10 mm and/or a (mean) width and thickness of less than 1 mm. Such chips, which are also referred to as fine chips, are usually used for manufacture of standard chip boards.

The OSB boards made from strands are distinguished by the use of the thin elongated strands by a higher flex strength than the normal chip boards that are also referred to as flat press boards. However, as a rule, the rough surface caused by the coarse particles, which is disadvantageous in particular for subsequent surface processing, for example painting, is disadvantageous in the case of OSB boards, since the irregular surface remains visible through the coating or paint layer.

For this reason, in the case of the multilayer hybrid boards of the type described above, cover layers are made on both sides that are not composed of (coarse) strands, but of (fine) chips (or alternatively also of fibers), so that wood construction boards with excellent optical properties are made. The disadvantage of these wood construction boards is that the strands responsible for the bending strength are relatively far away from the surface, so that the flexural strength is thus reduced compared to conventional OSB boards.

A multilayer wood construction board and a method of making such a board that contains one or more core layers of strands and one or more cover layers made of finer particles, is known, for example, from U.S. Pat. No. 6,461,743. In addition, papers are also processed there in order to improve the properties of the board.

DE 1 202 481 discloses a method of making multilayer wood construction boards that consist of a thick core layer of coarse wood particles mixed with binder and two outer, thinner cover layers, wherein the layered arrangement is compressed under pressure and heat application. In this method, the core layer is embedded between two streams that each consist of a slurry of loose felted cellulose fibers. The wood phase of the core layer is mixed with dry, powdery binder in a manner known per se. Preferably, the thin-liquid fiber suspension for the cover layers consists of waste paper. The core layer can be made from veneers that are arranged in a known manner in a plurality of sublayers one above the other with fibers crossing essentially at right angles.

A wood construction board, in particular an OSB board with aligned narrow-length wood chips, is also known from DE 199 135 89. The board consists of a core layer and cover layers on both sides in a sandwich construction, and the two cover layers are formed of at least an outer layer and an inner layer each with wood chips oriented in different directions.

DE 10 200 5 038 833 describes an OSB board having at least one upper cover layer, at least one middle layer and at least one lower cover layer, all of which consist of resin glued strands. In addition, a fabric layer is applied to the surface of the upper cover layer or the lower cover layer in order to increase the bending strength.

Further examples of multilayer wood construction boards and corresponding production methods are found in DE 10 2017 111 134, DE 10 2015 120 653 and DE 20 2017 104 749.

OBJECTS OF THE INVENTION

Proceeding from the previously known prior art, the object of the invention is to create a construction board of the above-described type described that is distinguished by a high flex rigidity and a satisfactory surface finish with simple construction and economical production.

SUMMARY OF THE INVENTION

In order to attain this object, the invention teaches a generic construction board of the above-described type where one or preferably both cover layers are non-full-surface cover layers such that individual strands extend at least partially through the respective cover layer to form interruptions in the cover layer up to the surface of the board and are there visible.

The invention is based on the discovery that boards, e.g. wood construction boards with particularly high flexural strength or bending strength can be made on an OSB basis and consequently of strands, preferably from a plurality of layers of strands with different orientation. Furthermore, the invention is based on the discovery that, in order to improve the surface properties, it is fundamentally advantageous to use such an OSB core layer or such OSB core layers on both sides with cover layers of chips and in particular fine chips. However, the invention has recognized that, in order to improve the surface properties, it is not necessary to produce the cover layers of fine material in such a large thickness that the cover layers completely cover the OSB core layers. This is because, according to the invention, only very thin, partially covering cover layers are applied on both sides of the OSB core layer, which cover layers are merely intended to fill and flatten the intermediate spaces between the individual coarse chips on the outside during of the strewing process on the core layer or on the core layers. This is advantageous on the one hand because only very small amounts of chips and consequently fine material are required in order to compensate for the uneven surface of the OSB layers. However, it is particularly advantageous that the bending stiffness of the wood construction board, which is ensured substantially by the OSB core layer, is only insignificantly impaired, since the cover layers made of fine material are extremely thin and not over the entire surface. Overall, a wood construction board is created that can be made simply and cost-effectively and nevertheless has excellent strength properties and good surface quality. The board is thus particularly suitable for further processing by, for example, coating or a painting.

According to the invention, plant particles and consequently lignocellulose-containing particles are used as particles both for the core layer and for the cover layer, in particular from perennial plants (wood). Thus, strands of wood or wood materials are particularly preferably used for the core layer. Alternatively, annuals, for example grass-like plants, straw or the like, can also be used for the strands. The chips for the cover layers are also plant particles, that is to say lignocellulose-containing particles. Chips are particularly preferred of perennial plants (wood chips). Alternatively, chips having the specified dimensions can also be used from annual plants, for example from grass-like plants, straw or the like.

In order to improve the mechanical properties of the board, preferably not only a single or homogeneous core layer of strands is used, but a plurality of core layers of strands or a core layer of a plurality of sublayers between the cover layers whose strands are oriented in different directions. Thus, in particular, three sublayers can be provided in the core layer, for example a middle sublayer and two outer sublayers, and the outer sublayers of the core layer adjoin the outer layers. The strands are preferably oriented in the central sublayer of the core layer transversely to the longitudinal direction of the board and consequently transversely to the direction of transport of the mat or board during manufacture process. The two outer sublayers of the core layer are preferably oriented in the longitudinal direction and consequently along the longitudinal direction of the board or transport direction.

The core layer (or the plurality of core layers) can preferably (together) have a weight per unit area of more than 5 $kg/m^2$, e.g. a weight per unit area of 5 to 15 $kg/m^2$.

It is of particular importance that very thin cover layers or cover layer material are used. It is thus expedient to use cover layers (made of chips) each having a weight per unit area of less than 1.5 $kg/m^2$, preferably less than 1 $kg/m^2$.

According to a further proposal of the invention, the two cover layers (made of chips or fine chips) have a different weight per unit area and preferable that of the upper cover layer, is at least 10% greater than the weight per unit area of the other cover layer, e.g. the lower cover layer, particularly preferably at least 15% greater. The invention is based on the discovery that, during manufacture, a multilayer pressed material mat is first made that is subsequently pressed in a press using pressure and heat. In this case, the possibility exists of first strewing the cover layer material for the lower cover layer on a belt conveyor in a forming station or forming line, and subsequently strewing the one core layer or the plurality of core layers from strands and then strewing the upper cover layer or the material for the upper cover layer (strands or fine chips) onto this core layer or the upper face of the core layer. While the material for the lower cover layer rests flat on the belt conveyor, the material for the upper cover layer can enter the previously strewn core layer and consequently get into the spaces between the strands, so that for achieving optimum board properties for the upper cover layer or the upper pressed-material layer, somewhat more material is used than for the lower cover layer.

The invention thus relates not only to construction board or sheet construction board, but also to a method of making a construction board or sheet construction board, and a multilayered pressed material mat having at least one (central) core pressed-material layer made of strands (or coarse chips) and lower and upper cover pressed-material layers made of chips (or fine chips) and the multilayer pressed-material mat are pressed with core layer and cover layers to form the (wood) construction board. The mat can be pressed in a known manner in a continuously operating press (e.g. double-belt press) or alternatively in a batch press. Optionally, surfaces of the cover layers are ground after pressing. The fact that, in the wood construction board made in this way, the cover layers are non-full-surface cover layers, is of particular importance such that individual strands extend at least partially through the cover layer to form interruptions in the cover layer up to the surface of the board and are thus visible. The strands consequently partially extend partially over the entire thickness of the board, that is to say at some points of the board, are arranged over the entire thickness of the strands.

There are various possibilities for manufacture.

In a first variant of the method according to the invention, the lower and the upper cover pressed-material layers are made in such a way and are consequently already set before pressing such that during pressing the partial-surface cover layers are already formed and individual strands extend at least partially through the cover layers and thus are visible on the outer faces of the cover layers. The structure according to the invention with very thin and only partially covering outer layers made of fine chip is consequently already made during the pressing process by a corresponding design of the pressed-material mat.

In a second variant of the method according to the invention, the lower and the upper cover pressed-material layers are first made such that, during pressing, first complete cover layers with a closed surface made of cover layer chips are made and that the non-full-area cover layers are subsequently formed by grinding the cover layers and individual strands extending through the cover layers are at least partially exposed through the outer faces of the cover layers so as to be visible. In this alternative production mode, in an intermediate step, first wood construction boards with completely closed chip surfaces are made that, however, are then "opened" (directly) by machining, for example grinding, so that, after this additional method step, the wood construction board according to the invention is created.

Irrespective of which of the method variants is carried out, it is expedient to produce the core-pressed-material layer (that is to say the OSB layer or the OSB layers) in a basically known manner from spreadable or fluent stream by strewing, specifically preferably from strands that are mixed with a standard binder. In this case, known strewing machines or strewing machine arrangements with one or more strewing heads can be used, so that one or more core sublayers of pressed material or streams with the respectively desired orientation can be made in a known manner. In one possible embodiment of the invention, the upper pressed-material layers can also be made from free-flowing and consequently spreadable chips by a strewing process, chips preferably being used that are mixed with a binder. In this respect, known strewing machines can also be used in this respect, so that, in one possible embodiment, the material for the lower cover layer is first formed on a substrate, then the strands for the core layer or core layers and finally the material for the upper cover layer are deposited, so that subsequently a multilayer pressed-material mat is introduced into a press and pressed using pressure and heat.

In an alternative embodiment, the cover layers are not made in a classic manner from free-flowing material by a strewing process, but are made from a fluent, slurry-like and optionally viscous chip-liquid mixture. In this variant, the cover layers can be applied particularly thin and thus particularly economically. During the pressing process, the slurry-like layer can flow and thus perfectly fill the interstices between the OSB chips and flatten the surfaces. This is also related to the fact that although the slurry can be made from chips of basically known size, the chips have a still smaller dimension in this consistency and are thus even more finely distributed. In this possible embodiment of the invention, the upper pressed-material layer is made from the a suspension of fluent chip-liquid mixture that contains, on the one hand, solid particles (chips) and, on the other hand, a liquid, for example water, and also preferably a binder (e.g. glue). In this embodiment, a fluent mixture is used, that is to say the mixture of chips and the liquid (in particular water, but also glue and wash emulsion and other liquid additives) are adjusted such that the resulting viscosity of the mixture can still flow. The proportion of the liquid in the mixture is more than 100% of the proportion of (dry) chips, based on the weight, particularly preferably more than 200%. This means that within the mixture the liquid portion at least as large as the chip portion, preferably at least twice as large (i.e. 200%), particularly preferably at least three times (i.e. 300%), in each case based on weight.

The fluent liquid-span mixture can be made in various ways. There is, for example, the possibility of making a liquid-glue mixture and, on the other hand, to comminute the wood particles in a known manner in a mill to the desired granularity and then mix the wood particles with the liquid-glue mixture, for example in a separate mixer.

Alternatively, a liquid-glue mixture can be added to the wood particles in the mill and for mixing in the comminution process with the liquid at the same time as the milling. Alternatively, the liquid, the glue and the wood particles can be added separately to the mill, so that mixing of the three components takes place in the mill to form the liquid/wood mixture.

The fluent mixture or slurry made in this way can be processed to form the web-like layers by various methods, for example by extrusion. In this respect, for example, the lower layer can be extruded onto the conveyor. The OSB layer is then sprinkled thereon in a known manner and the upper cover layer or the material for the upper cover layer is then again extruded thereon. Alternatively, a roller application can also be carried out.

It is of particular importance according to the invention that basically known particles, e.g. wood material particles, can be used for the individual layers, specifically for the core layer strands that are common for the OSB production. In the context of the invention, strands means long, narrow chips having a length of more than 50 mm, preferably more than 80 mm, for example 100 mm to 200 mm, and having an average width of more than 5 mm, preferably more than 8 mm, e.g. 10 mm to 50 mm and with a thickness of more than 0.5 mm, e.g. 0.6 mm to 1.5 mm According to the invention, chips that are significantly smaller than the strands of the core layer are defined as chips (for the cover layers). Chips means wood particles having a length of less than 20 mm, preferably less than 10 mm and having an average width and an average thickness of less than 2 mm, preferably less than 1 mm. Particularly preferred for the cover layers are fine chips or chips. Fine chips with a size (in the dry state) are used, which corresponds to a mesh size of less than 2 mm, preferably less than 1 mm, particularly preferably less than 0.5 mm.

Strands and chips that are used according to the invention are made by (mechanical) comminution from the starting product (e.g. wood) and can be distinguished from the likewise known fibers (for example for MDF) that are not used according to the invention.

Preferably, particles (strands and chips) are preferably used that are mixed with a binder. In this case, it is possible to use basically known binders for manufacture of wood-based construction boards. Thus, for example, isocyanates or isocyanate-based isocyanates can be used as binders (pMDI). Alternatively, a urea resin or a binder based on urea resin (UF) can be used. Furthermore, phenol glues (PF) or melamine-reinforced UF (MUF) can be used. These can optionally be provided with phenol (MUPF, UMPS).

BRIEF DESCRIPTION OF THE DRAWING

The invention is explained in more detail below on the basis of drawings showing a single embodiment. Therein.

SPECIFIC DESCRIPTION OF THE INVENTION

Figure 1:
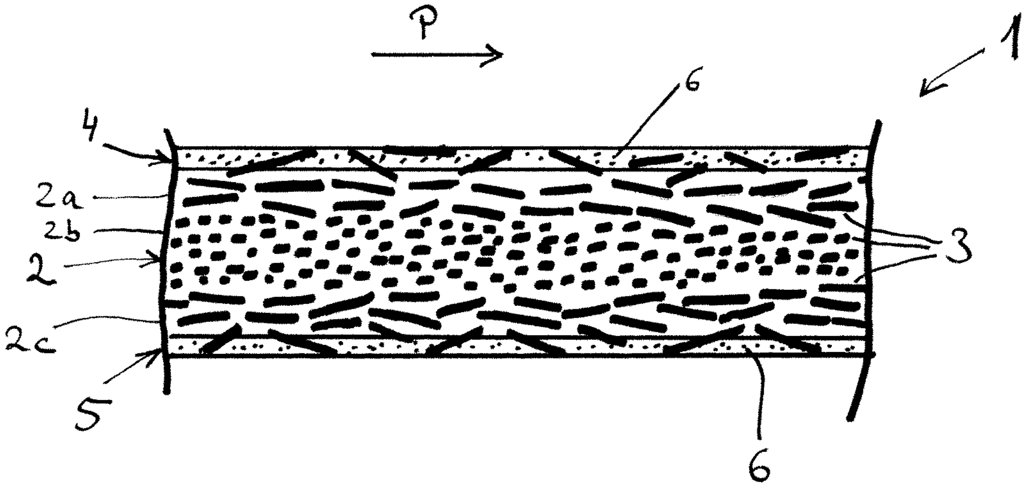
FIG. 1 is a simplified vertical section through a wood construction board according to the invention.
Figure 2:
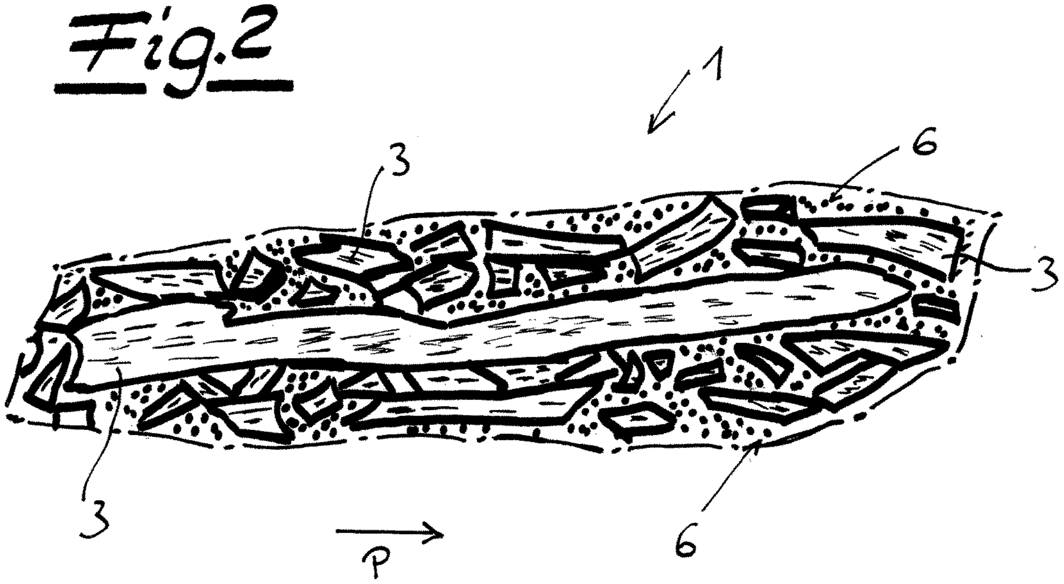
FIG. 2 is a large-scale plan view of a detail of the surface of a wood construction board according to the invention.

FIG. 1 is a simplified transverse section through a wood construction board 1 according to the invention that has on the one hand a core layer 2 made of strands 3 and on the other hand an upper cover layer 4 and a lower cover layer 5 made of chips 6. In the illustrated embodiment, the core layer 2 consists of a plurality of sublayers 2*a*, 2*b*, and 2*c* each consisting of the strands 3, with the strands 3 oriented in each of the individual sublayers 2*a*, 2*b*, and 2*c*. The drawing shows a possible embodiment in which the strands 3 extend in the middle layer 2*b* transversely to the longitudinal direction of the board or production direction P. The strands 3 of the upper layer 2*a* and of the lower layer 2*c* are longitudinally oriented, that is to say they extend with their longitudinal direction generally parallel the longitudinal direction P of the board. Such wood construction boards with multilayer core layers and in each case upper and lower cover layers are known in principle from the prior art. According to the invention, the strands 3 extend at least partially through the cover layer 4, 5 to form interruptions of the respective cover layer 4, 5 at the board surface and are thus visible. This results from a comparative consideration of FIGS. 1 and 2. The cover layers 4, 5 do not cover the entire surface, but individual strands 3 project as far as the surface, so that they are directly visible, for example, in the top view according to FIG. 2 on the cover layer 4. Although an upper cover layer 4 made of (fine) chips 6 is provided in the board according to the invention, it is so thin according to the invention that individual strands 3 extend as far as the surface and consequently through the cover layers 4 and are thus visible. Consequently, only very small amounts of cover layer chips 6 are used and these serve (only) for leveling the relatively coarse surfaces of the OSB board, so that a wood construction board 1 with perfect surface quality is created This is shown in FIG. 2. It should be noted that here in most cases only parts of the strands 3 are seen, since these strands lie partly below the surface and only their ends or sections project as far as the surface and are visible on the surface.

Figure 3:
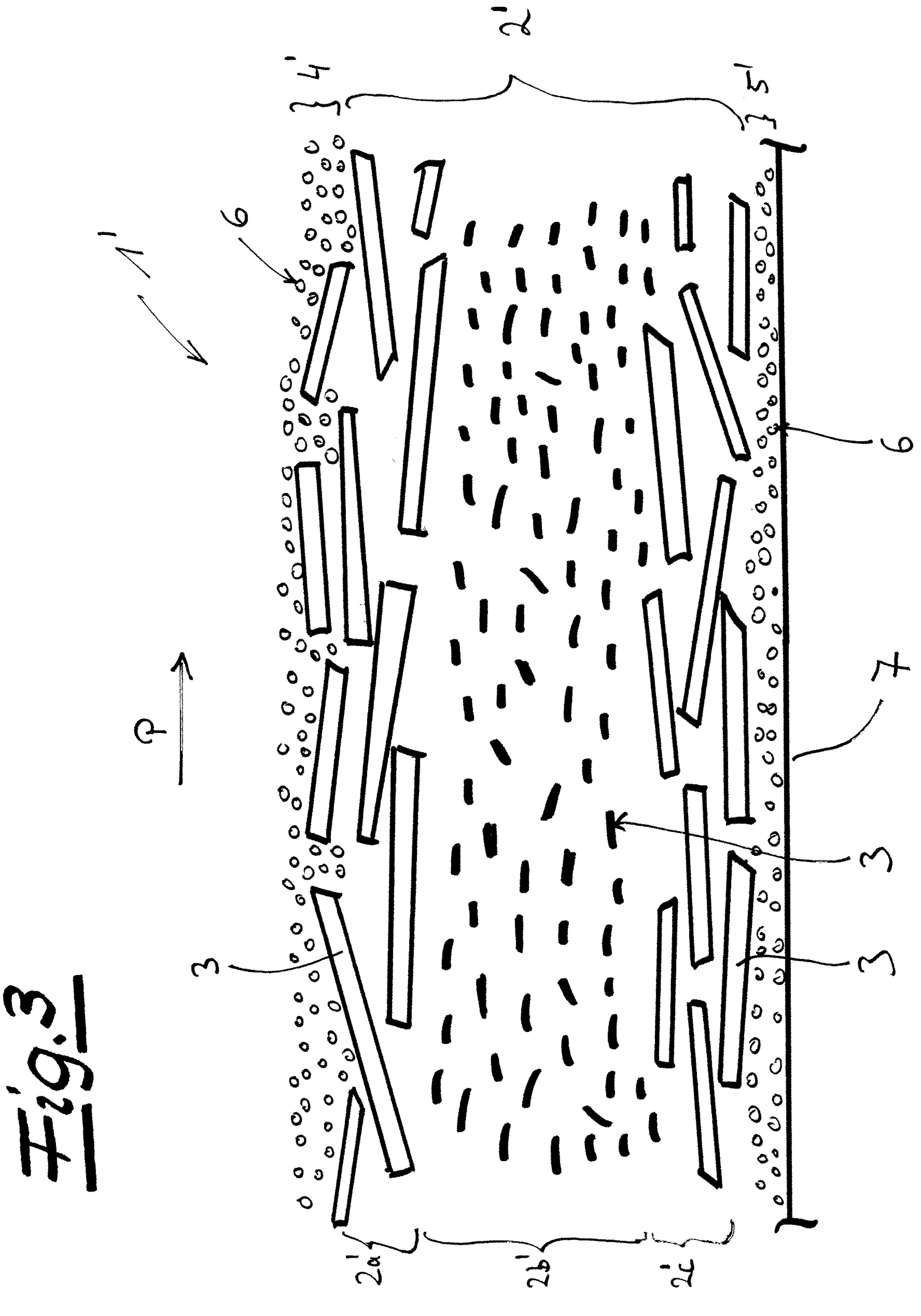
FIG. 3 is a vertical section through a pressed material mat for making a boards as shown in FIG. 1.

A wood construction board of this type according to FIGS. 1 and 2 is made by first making a multilayer pressed material mat 1' that has a core pressed-material layer T made of strands and an upper cover pressed-material layer 4' made of chips and a lower cover pressed-material layer 5' made of chips 6. Such a pressed material mat T that made on a forming belt 7 is shown in FIG. 3. This pressed material mat T can be made, for example, in a press 8 using pressure and heat to form the wood construction board according to FIG. 1. The drawing shows an embodiment in which the layers are made during manufacture of the pressed material mat T such that, during pressing in the press 8, the wood construction board 1 is made directly with the strands of the core layer 2 extending through the cover layers 4, 5 to the surface and thus being visible. In FIG. 3 by way of example, a pressed material mat T is shown, in which all layers are made from spreadable, free-flowing pressed material, that is to say both the cover pressed-material layers 4', 5' and the core pressed-material layer 2' are made of strewn chips or strands in free-flowing form with conventional strewing devices one after the other on the forming belt 7. In principle, these are particles 3, 6 that are provided with a binding agent.

It has already been explained with reference to FIG. 1 that the core layer 2 consists of a plurality of sublayers 2*a*, 2*b*, and 2*c* with different strand orientations. For this purpose, according to FIG. 3, a pressed material mat 1' is made in which the core pressed-material layer 2' is again made from a plurality of sublayers 2*a'*, 2*b'*, 2*c'* with the corresponding orientations of the strands 3. This is also indicated in FIG. 3 by the different representation of the strands 6 in the individual sublayers 2*a'*, 2*b'*, 2*c'*.

In this embodiment, it is also expedient if chips or layers with a different weight per unit area are used for the two cover layers 4, 5. FIG. 3 shows that slightly fewer chips 6 can be used for the lower cover pressed-material layer 5' than for the upper cover pressed-material layer 4'. The consideration is that the lower cover pressed-material layer 5' is initially substantially closed and applied flat to the forming belt 7, while the upper cover pressed-material layer 4' applied to the core layer 2' partially flows into the upper surface. As a result, unequal tensile stresses of the cover layers are formed after the pressing. As a result of the unequal area weights of the two fine-particle cover layers, they are made the same by the pressing process, so that a wood-based construction board 1 with satisfactory properties is produced.

Optionally, it is also possible to produce the upper pressed-material layers 4', 5' not from conventional free-flowing chips, but from a fluent chip-liquid mixture 9. Such a production is illustrated by way of example in FIG. 4. The installation for making a construction board 1, which is only illustrated in a simplified manner, has the already mentioned press 8 and the belt 7 on which the pressed material mat 1' is made, so that this pressed material mat 1' is pressed in the press 8 using pressure and heat to form the wood construction board 1. In order to produce the pressed material mat 1', the system has a forming station 10 that, on the one hand, has feeders 11 for the core layer and, on the other hand, feeders 12 for the cover layers. While the feeders 11 for the core layer are in the form of conventional spreading machines or strewing heads for the application of the strands 3, the feeders 12 for the two cover layers in this embodiment are adapted for the already mentioned liquid application of the cover layers or for making the chip-liquid mixture 9. They can be, for example, extruders that emit the chip-liquid mixture 9 to form the respective cover pressed-material layers 4' and 5'. Thus, first of all, the lower cover pressed-material layer 5' is extruded onto the shaping belt 7 as a chip/liquid mixture. The individual sublayers 2*a*, 2*b*, and 2*c* of the core-pressed-material layer 2' are conventionally strewed thereon, specifically by the feeders 11, and a strewing head 11 for the lower core layer and a strewing head 11 for the upper core layer and two intermediate strewing heads 11 for the central core layer are shown between them. The upper cover pressed-material layer 4' is in turn extruded as a chip/liquid mixture to the core pressed-material layer 2', specifically in turn with the extruder 12.

Figure 4:
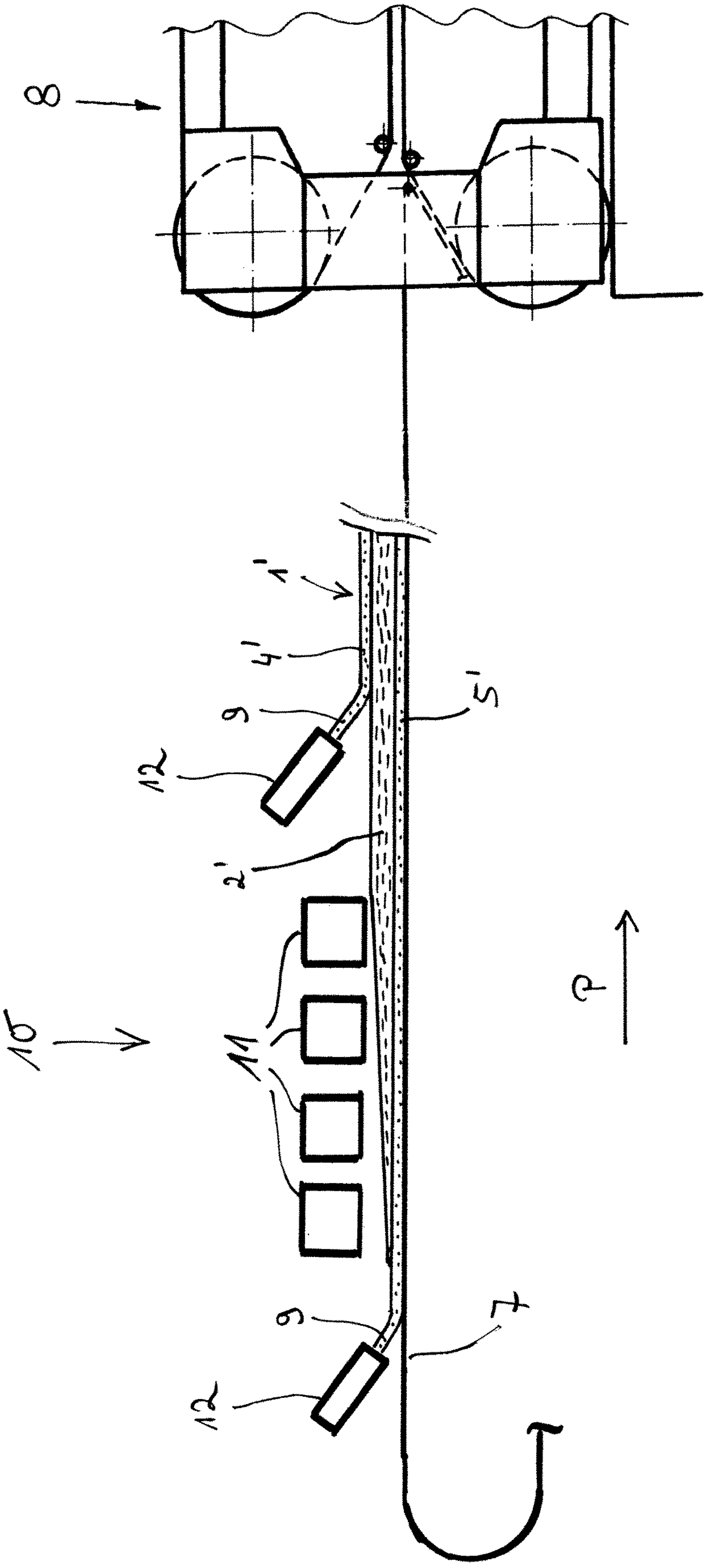
FIG. 4 is a highly simplified side view of a possible apparatus for making a wood construction board according to the invention.

Moreover, the system indicated schematically in FIG. 4 can, of course, have further conventional components that are not shown in FIG. 4. Thus, for example, devices for processing the pressed material mat 1', a prepress and/or preheater, devices for detecting foreign bodies and/or a faulty bed can be provided between the molding station 10 and the press 8.

The invention claimed is:

1. A method of making a flat construction board, the method comprising the steps of:

making a core layer of strands;

making lower and upper cover layers of chips;

pressing the upper and lower cover layers and the core layer together to make a multilayer mat of pressed material with the core layer between the upper and lower cover layers to form a board with full-surface closed outer surfaces formed by outer faces of the upper and lower cover layers; and thereafter surface treating the closed outer surfaces of the upper and lower cover layers such that individual strands of the core layer extend at least partially through the cover layers and to form interruptions in the outer surfaces of the upper and lower cover layers where the individual strands become visible to form the material board.

2. The method according to claim 1, wherein the core layer is made from the strands by strewing.

3. The method according to claim 1, wherein the cover layers are made from chips by strewing.

4. The method according to claim 1, wherein the cover layers are made from a fluent chip/liquid mixture.

5. The method according to claim 1, wherein the upper cover layer is made from a fluent chip/liquid mixture by extrusion or by roller application.

6. The method according to claim 1, wherein the outer surfaces are surface treated by grinding.

7. The method according to claim 1, wherein individual strands of the core layer extend at least partially through the upper and lower cover layers to form interruptions in the cover layers on outer faces of the board.

8. The method according to claim 7, wherein parts of the strands projecting through at least one of the upper and lower cover layers onto the surface or visible on the surface constitute at least 20% of a total surface of the board.

9. The method according to claim 7, the method further comprising the step of:

making the core layer of strands as a plurality of sublayers between the upper and lower cover layers, and orienting the strands in the sublayers of the core layer in different directions.

10. The method according to claim 7, wherein the cover layers have a weight per unit area of less than 1.5 $kg/m^2$.

11. The method according to claim 7, wherein the cover layers constitute less than 10% of the weight per unit area of the board.

12. The method according to claim 7, wherein the upper and lower cover layers have different basis weights per unit area, with one of the cover layers at least 10% greater than the weight per unit area of the other cover layer.

* * * * *